US008615466B2

(12) United States Patent
Aiglstorfer et al.

(10) Patent No.: US 8,615,466 B2
(45) Date of Patent: Dec. 24, 2013

(54) METHOD AND SYSTEM FOR DOWNLOADING INFORMATION INTO A SECURE ELEMENT OF AN ELECTRONIC DEVICE

(75) Inventors: Rodney Aiglstorfer, Corte Madera, CA (US); Benjamin Vigier, San Francisco, CA (US)

(73) Assignee: Mfoundry, Sausalito, CA (US)

( * ) Notice: Subject to any disclaimer, the term of this patent is extended or adjusted under 35 U.S.C. 154(b) by 495 days.

(21) Appl. No.: 12/621,319

(22) Filed: Nov. 18, 2009

(65) Prior Publication Data

US 2010/0138518 A1 Jun. 3, 2010

Related U.S. Application Data

(60) Provisional application No. 61/117,520, filed on Nov. 24, 2008.

(51) Int. Cl.
*G06Q 40/00* (2012.01)

(52) U.S. Cl.
USPC ............ 705/39; 235/379; 455/418; 705/26.1; 705/28; 705/35; 705/40; 705/41; 705/44; 705/64; 709/203

(58) Field of Classification Search
None
See application file for complete search history.

(56) References Cited

U.S. PATENT DOCUMENTS

| 6,601,761 | B1* | 8/2003 | Katis ............................. 235/379 |
| 7,693,796 | B2* | 4/2010 | Light et al. ...................... 705/64 |
| 2004/0143550 | A1* | 7/2004 | Creamer et al. ................ 705/41 |
| 2007/0125840 | A1* | 6/2007 | Law et al. ...................... 235/379 |
| 2008/0003991 | A1* | 1/2008 | Sievers et al. ................. 455/418 |
| 2008/0319887 | A1* | 12/2008 | Pizzi et al. ....................... 705/35 |
| 2009/0070411 | A1* | 3/2009 | Chang et al. .................. 709/203 |
| 2009/0089176 | A1* | 4/2009 | McCabe ........................ 705/26 |
| 2009/0119209 | A1* | 5/2009 | Sorensen et al. ............... 705/40 |
| 2009/0132392 | A1* | 5/2009 | Davis et al. ..................... 705/28 |
| 2009/0234751 | A1* | 9/2009 | Chan et al. ...................... 705/26 |
| 2010/0088225 | A1* | 4/2010 | Forsberg ........................ 705/39 |
| 2010/0179907 | A1* | 7/2010 | Atkinson ........................ 705/44 |

FOREIGN PATENT DOCUMENTS

WO WO 97/03410 * 1/1997 ............. G06F 17/60

OTHER PUBLICATIONS

Steinsholt, Vegard. Master Thesis at Department of Telematics, NTNU 2003.*

* cited by examiner

*Primary Examiner* — Robert Niquette
(74) *Attorney, Agent, or Firm* — Finnegan, Henderson, Farabow, Garrett & Dunner, L.L.P.

(57) ABSTRACT

A method for downloading information from a remote server. The method includes receiving, at a portable device, banking card information for an account and storing the banking card information into a secure memory within the portable device. Responsive to the receiving, a first moblet software module automatically sends a wireless message to the remote server to inform the remote server of the banking card information being received at the portable device. The portable device may receive a second moblet software module associated with the banking card information. The portable device may subsequently execute the second moblet software module which utilizes the banking card information, wherein the first and second moblet software modules comprise device independent commands of a generic syntax and wherein further the commands are executed by a device dependent software module also resident on the portable device.

31 Claims, 10 Drawing Sheets

700

REPLACEMENT SHEET

RESPONSIVE TO A USER REQUEST, THE PORTABLE DEVICE SENDING A MESSAGE TO A REMOTE SERVER TO DOWNLOAD A FIRST MOBLET SOFTWARE MODULE
710

↓

THE PORTABLE DEVICE RECEIVING FROM THE REMOTE SERVER A DEVICE DEPENDENT SOFTWARE MODULE
712

↓

THE PORTABLE DEVICE RECEIVING FROM THE REMOTE SERVER THE FIRST MOBLET SOFTWARE MODULE
714

↓

THE PORTABLE DEVICE EXECUTING THE FIRST MOBLET SOFTWARE MODULE USING THE DEVICE DEPENDENT SOFTWARE MODULE
716

↓

RECEIVING CARD INFORMATION FOR A FIRST ACCOUNT AND STORING THE CARD INFORMATION IN A SECURE MEMORY
718

↓

THE FIRST MOBLET SOFTWARE MODULE AUTOMATICALLY SENDING A WIRELESS MESSAGE TO THE REMOTE SERVER TO INFORM THE REMOTE SERVER OF THE CARD INFORMATION BEING RECEIVED AT THE PORTABLE DEVICE
720

↓

THE PORTABLE DEVICE RECEIVING A SECOND MOBLET SOFTWARE MODULE ASSOCIATED WITH THE CARD INFORMATION
722

↓

THE PORTABLE DEVICE EXECUTING THE SECOND MOBLET SOFTWARE MODULE
724

↓

FIGURE 7A

METHOD AND SYSTEM FOR DOWNLOADING INFORMATION INTO A SECURE ELEMENT OF AN ELECTRONIC DEVICE

RELATED APPLICATIONS

This application claims the benefit and priority to a provisional application No. 61/117,520, inventors Aiglstorfer et al., entitled "A METHOD AND SYSTEM FOR DOWNLOADING INFORMATION INTO A SECURE ELEMENT OF AN ELECTRONIC DEVICE" that was filed on Nov. 24, 2008. The above-cited provisional application is incorporated herein in its entirety.

This application is related to a U.S. patent application Ser. No. 11/768,139, entitled "Dual Factor Authentication" that was filed on Jun. 25, 2007 and assigned to the same assignee. The U.S. patent application Ser. No. 11/768,139 is incorporated herein in its entirety. Moreover, this application is related to PCT/US2006/007408, entitled "Systems and Methods for Application Program" filed on Mar. 1, 2006 and assigned to the same assignee. The PCT/US2006/007408 application is incorporated herein in its entirety.

TECHNICAL FIELD

Embodiments of the present invention relate to the field of electronics. More particularly, embodiments of the present invention relate to downloading information into a secure element of an electronic device.

BACKGROUND

In general, personal wallets are not interactive items. A wallet may contain credit cards, medical cards, debit cards, transit cards, etc. However, one cannot interact with a card, e.g., check available balances, deposit money, withdraw money, transfer money from one card to another, etc.

One conventional method employs an electronic device, e.g., laptop, PDA, etc., in order to enable user interaction with a specific account. Unfortunately, conventional electronic devices require the user to take active steps, e.g., enter username and password, in order to gain access to various accounts.

Moreover, each card or account is not associated with a specific application operating on the electronic device. For example, users generally employ a generic web browser to access a card and the account associated with that card. Generally financial information associated with each card is not installed on the electronic device due to security issues.

SUMMARY

It is advantageous to combine the functionality of a conventional card with an electronic device to create an electronic wallet to enable a user to interact with an account associated with the conventional card. In one embodiment, the electronic wallet can be used as a credit card in an easy-to-use fashion while maintaining its functionalities as an electronic device. It is advantageous and important that the financial information be installed on the electronic wallet in a secure manner that may be transparent to the user. It will become apparent to those skilled in the art in view of the detailed description of the present invention that the embodiments of the present invention provide the above referenced advantages.

According to one embodiment, the electronic wallet implements a method for automatically downloading information from a remote server. The electronic wallet may be implemented on a cellular phone or other portable electronic device.

The method includes receiving, at the electronic wallet, card information, e.g., banking information associated with the card, for an account and storing the card information into a secure memory within the electronic wallet. Responsive to the receiving, a first moblet software module automatically sends a wireless message via a wireless network to a remote server to inform the remote server of the card information being received at the electronic wallet. The electronic wallet receives a second moblet software module associated with the banking card information. The electronic wallet executes the second moblet software module that utilizes the card information. According to one embodiment, the first and second moblet software modules comprise device independent commands of a generic syntax and wherein further the commands are executed by a device dependent software module also resident on the electronic wallet.

It is appreciated that according to one embodiment, the receiving of the second moblet software module is performed transparently to a user of the electronic wallet. In one embodiment, the second moblet software module is received wirelessly via a wireless network.

It is appreciated that responsive to a user request, the electronic wallet may send a message to the remote server to download the first moblet software module. The sent message may indicate a device type of the electronic wallet. Accordingly, the electronic wallet receives from the remote server the device dependent software module via a wireless network. Moreover, the electronic wallet receives from the remote server the first moblet software module via a wireless network. Accordingly, the electronic wallet executes the first moblet software module using the device dependent software module. According to one embodiment, the first and the second moblet software modules are written using MOJAX commands.

According to one embodiment, the electronic wallet may receive card information, e.g., banking information, associated with a second account and storing the card information for the second account into the secure memory within the electronic wallet. Responsive to the receiving, the first moblet software module may automatically send a wireless message, via a wireless network, to the remote server to inform the remote server of the card information for the second account being received at the electronic wallet. The electronic wallet further receives a third moblet software module associated with the banking card information for the second account. The electronic wallet may execute the third moblet software module that utilizes the card information for the second account. In one embodiment of the present invention the third moblet software module comprises device independent commands of the generic syntax and wherein further the commands are executed by the device dependent software module.

According to one embodiment of the present invention, the electronic wallet may display graphical icons of the second and third moblet software modules on a display of the electronic wallet. As such, the graphical user interface (GUI) allows user selection of the second and third moblet software modules. It is appreciated that the second and the third moblet software modules may be controlled by operations of the first moblet software module.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 7A and 7B show an exemplary flow diagram for downloading information into a secure element in accordance with one embodiment of the present invention.

DETAILED DESCRIPTION

Figure 1:
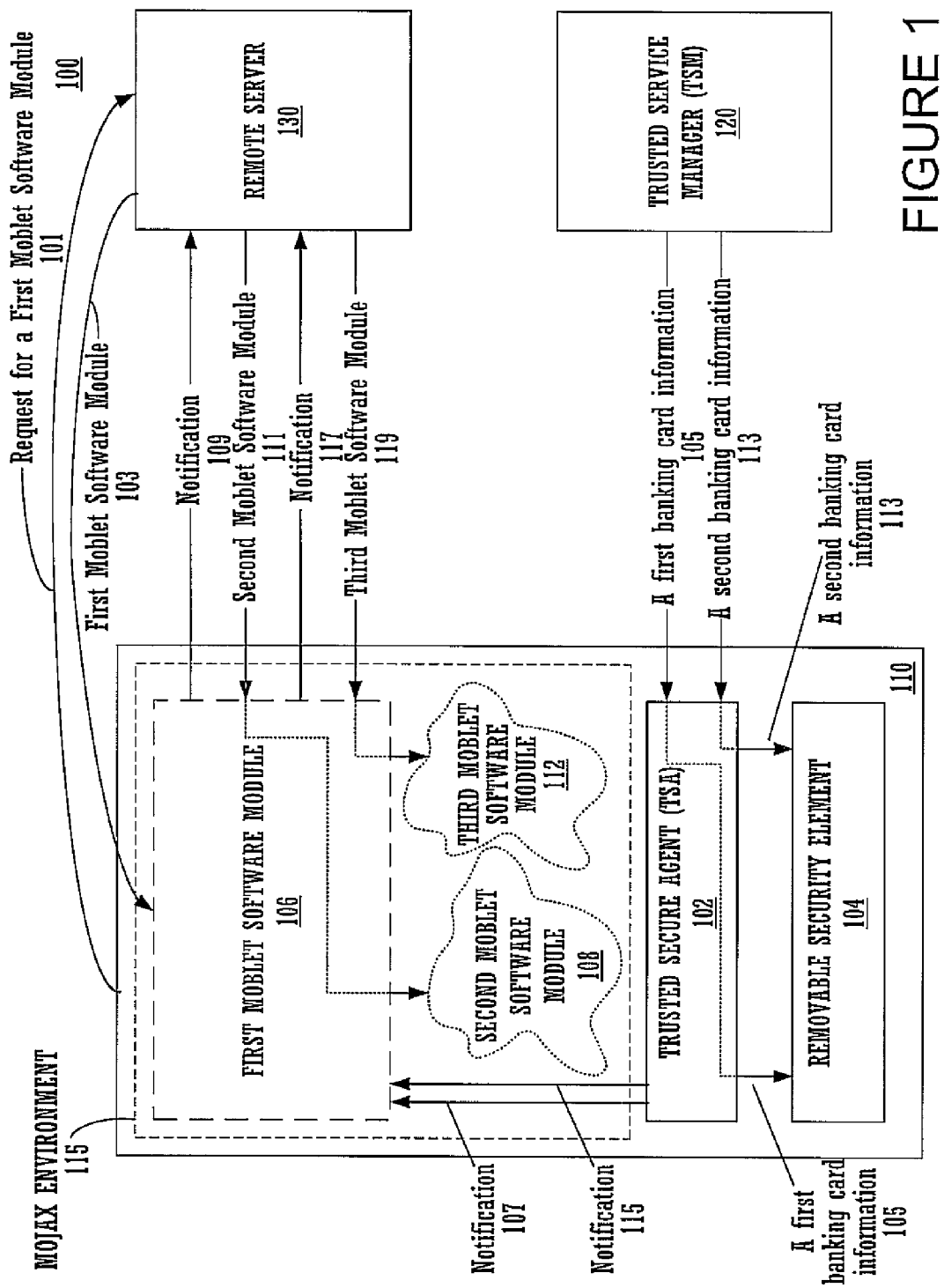
FIG. 1 shows an exemplary system for downloading information to an electronic wallet comprising a removable security element in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on television set memory. These descriptions and representations are the means used by those skilled in the art to most effectively convey the substance of their work to others skilled in the art. A procedure, television set executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or "querying" or "receiving" or "sending" or "providing" or "storing" or "displaying" or "rendering" or the like, refer to the action and processes of a television set, or similar electronic computing device, that manipulates and transforms data represented as physical (electronic) quantities within the television set's registers and memories into other data similarly represented as physical quantities within the television set memories or registers or other such information storage, transmission or display devices.

A Method and System for Downloading Information into a Secure Element of an Electronic Device Referring now to FIG. 1, an exemplary system 100 for downloading information to an electronic wallet comprising a removable security element in accordance with one embodiment of the present invention is shown. The system 100 includes an electronic device 110 which may be any portable electronic device, e.g., an electronic wallet, a cellular phone, a personal digital assistant (PDA), etc., a trusted service manager (TSM) 120 and a remote server 130.

The electronic device 110 may be a portable electronic device that can be used to pay for purchases on the go, similar to the use of a credit card in a conventional fashion. The electronic device 110 utilizes a graphical user interface (GUI) to enable a user friendly interaction associated with payments and financial information, for instance.

The TSM 120 is a trusted entity in charge of sending secure information, e.g., financial information, regarding a specific user to the electronic device 110. The TSM 120 may verify and authenticate the user with regard to a particular bank or financial institution. For example, the identity of a user with a Bank of America account may be verified and authenticated. It is appreciated that although embodiments herein are described with respect to banking information and bank accounts, the information may be related to any card, e.g., a reward card, a movie rental card, a gas card, a coffee shop card, a stored value card, a loyalty card, etc. As such, the use of banking information is exemplary and not intended to limit the scope of the present invention. After verification of the user identity and authentication of the user, the TSM 120 may transmit the banking information regarding the Bank of America account (for instance) to the electronic device 110.

The remote server 130 may provide various applications to the electronic device 110. For example, the remote server 130 may provide a first moblet software module 106 operable on the electronic device 110 that may in turn manage additional moblet software modules. It is appreciated that moblet software modules are operable in a MOJAX environment operating on a device. According to one embodiment, MOJAX is device specific while moblet software modules operating within the MOJAX environment are device generic.

It is appreciated that the first moblet software module 106 may be installed during manufacturing of the electronic device 110. Alternatively, the first moblet software module 106 may be requested 101 from the remote server 130 and subsequently downloaded. The request 101 may indicate a device type of the electronic device 110. In response to the request 101, the remote server 130 may transmit 103 the first moblet software module 106 to the electronic device 110. Furthermore, responsive to the request 101, the remote server 130 may also transmit 103 a device dependent software, e.g., MOJAX environment, to the electronic wallet. It is appreciated that in one embodiment the device dependent software may be installed during manufacturing of the electronic device 110.

The first moblet software module 106 is installed on the electronic device 110 and becomes operable on the electronic device 110. The first moblet software module 106 may manage additional moblet software modules. It is appreciated that the first moblet software module 106 may be operating within the electronic wallet environment. For example, the electronic wallet environment may have a corresponding graphical element icon. Upon a user selection of the electronic wallet environment, additional graphical element icons associated with moblet software modules may be displayed. The displayed moblet software modules may be executed upon selection thereof.

It is appreciated that moblet software modules may be self contained applications. It is further appreciated that one moblet software module may be executed at a time except for the first moblet software module 106 that manages other moblet software modules. For example, the first moblet software module 106 may cause one moblet software module to pass control from one moblet software module to another moblet software module. It is also appreciated that moblet software modules may be modified, controlled, removed and blocked by the first moblet software module 106. Each moblet software module may have its own corresponding cache for securing data within each moblet software module. A new moblet software module may be automatically downloaded to the electronic device 110 when one moblet software module makes a call to a moblet software module that does not reside within the electronic device 110.

The TSM 120 may transmit a first banking card information 105 to a trusted secure agent (TSA) 102 that resides on the electronic device 110. The first banking card information 105 may be transmitted when the identity of the user corresponding to the first banking card information is verified and authenticated. For example, if a user has a Bank of America account and the identity of the user is verified and authenticated, then the banking card information associated with the Bank of America account of the user may be transmitted to the electronic device 110.

In the electronic device 110 with a removable security element 104, the TSA 102 acts as a communication gateway between the TSM 120 and the electronic device 110. The removable security element 104 may be a subscriber identity module (SIM) card. The removable security element 104 may be equipped with near field communication (NFC) technology. It is appreciated that the TSA 102 may be a plug-in software module.

The TSA 102 stores the first banking card information 105 in the removable security element 104 in response to receiving the first banking card information 105. The TSA 102 may also notify 107 the first moblet software module 106 that the first banking card information has been received and is stored in the removable security element 104. The first moblet software module 106 may in turn notify 109 the remote server 130.

The remote server 130, in response to the notification 109, automatically transmits 111a second moblet software module to the first moblet software module 106. It is appreciated that the second moblet software module may be an application related to the first banking card information 105. The first moblet software module 106 may receive and install the second moblet software module 108 on the electronic device 110. As a result, the first banking card information 105 may be used in conjunction with the execution of the second moblet software module 108 to enable the user to interact with the second moblet software module 108 and the first banking card information 105 associated therewith. It is appreciated that the second moblet software module 108 may be a GUI type application that when executed enables user interaction therein to perform banking features.

According to one embodiment, the second moblet software module 108 may be transmitted wirelessly and installed on the electronic device 110 transparent to the user. It is appreciated that updates to the second moblet software module 108 may be transmitted and installed automatically. However, it is appreciated that the second moblet software module 108 or any updates thereof may also be received and installed on the electronic device 110 responsive to a user request.

It is appreciated that additional banking card information and moblet software modules associated therewith may be similarly received and installed and messaged by the first moblet 106. For example, a second banking card information 113 may be transmitted from the TSM 120 to the TSA 102. The TSA 102 may store the second banking card information 113 in the removable security element 104. The TSA 102 may subsequently automatically notify 115 the first moblet software module 106 of the transmission of the second banking card information. According to one embodiment, the first moblet software module 106 notifies 117 the remote server 130 that the second banking card information 113 has been received.

Responsive to the notification 117, the remote server 130 may automatically transmit 119 a third moblet software module to the first moblet software module 106. The first moblet software module 106 may thereafter install and store the third moblet software module 112. It is appreciated that the third moblet software module 112 may be an application related to the second banking card information 113. As a result, the second banking card information 113 may be used in conjunction with the execution of the third moblet software module 112 to enable the user to interact with the third moblet software module 112 and the second banking card information 113 associated therewith. It is appreciated that the third moblet software module 112 may be a GUI type application that enables user interaction therein to perform banking applications.

According to one embodiment of the present invention, the first, the second and the third moblet software modules include device independent commands of a generic syntax. In one embodiment, the first, the second and the third moblet software modules may be written using MOJAX commands. MOJAX is a language that enables manipulation of a web browser and flash. It is appreciated that the MOJAX commands are executed by the dependent software of the electronic device 110. The electronic device 110 dependent software resides on the electronic device 110.

According to one embodiment, the third moblet software module 112 may be transmitted wirelessly and installed on the electronic device 110 transparent to the user. It is appreciated that updates to the third moblet software module 112 may be transmitted and installed automatically. However, it is appreciated that the third moblet software module 112 or any update thereof may be received and installed on the electronic device 110 responsive to a user request.

It is appreciated that the transmission and installation of banking card information is exemplary and should not be construed as limiting the scope of the present invention. As such, any kind of information and moblet software module may be transmitted and installed within the MOJAX environment. For example, non-associated modules, e.g., coupon information, advertising, etc., may be transmitted and installed without requiring the TSM 120 to interact with the TSA 102 and to store that information within the removable security element 104. As such, non-associated modules may be directly transmitted by the remote server 130 to the first moblet software module 106 that operates within the MOJAX environment. It is appreciated that the transmission and installation of non-associated modules may be performed automatically by the remote server 130 or it may be responsive to a user interaction and/or user initiation.

Figure 2:
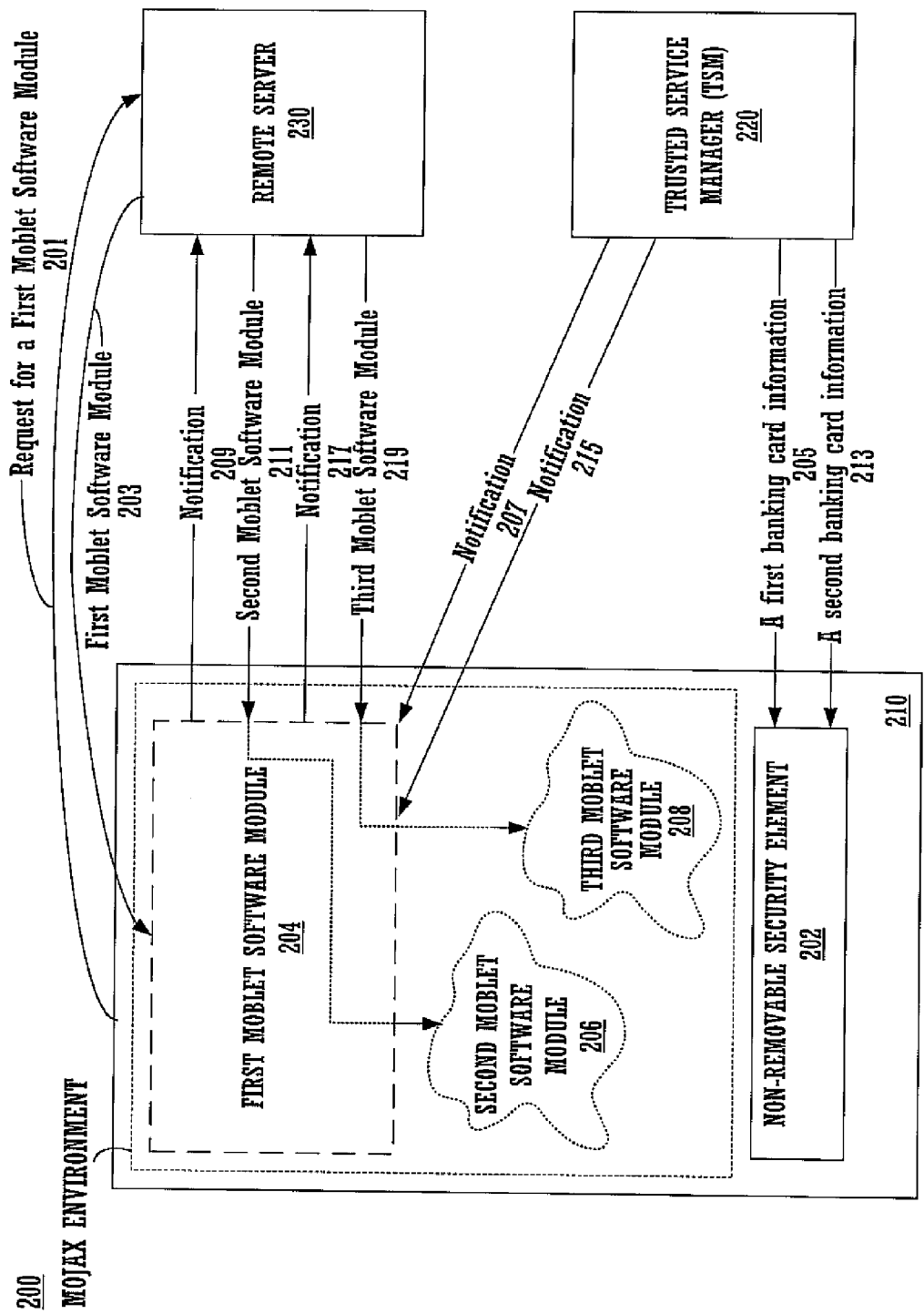
FIG. 2 shows an exemplary system for downloading information to an electronic wallet comprising a non-removable security element in accordance with one embodiment of the present invention.

Referring now to FIG. 2, an exemplary system 200 for downloading information to an electronic wallet comprising a non-removable security element in accordance with one embodiment of the present invention is shown. The system 200 includes an electronic device 210, e.g., an electronic wallet, a cellular phone, a PDA, etc., a trusted service manager (TSM) 220 and a remote server 230. It is appreciated that the TSM 220 and the remote server 230 operate similar to the TSM 120 and the remote server 130 already described above with respect to FIG. 1.

It is appreciated that a first moblet software module 204 may be installed during manufacturing of the electronic device 210. Alternatively, the first moblet software module 204 may be requested 201 from the remote server 230. The request 201 may indicate a device type of the electronic device 210. In response to the request 201, the remote server 230 may transmit 203 the first moblet software module 204 to the electronic device 210. Furthermore, responsive to the request 201, the remote server 130 may transmit 203 a device dependent software, e.g., MOJAX environment. It is appreciated that in one embodiment the device dependent software may be installed during manufacturing of the electronic device 110.

The first moblet software module 204 is installed and becomes operable on the electronic device 210. In this embodiment, since the electronic device 210 does not have a removable security element 104, the TSM 220 communicates to a non-removable security element 202 without using the TSA 102. Moreover, the TSM 220 communicates with the first moblet software module 204 without using the TSA 102. It is appreciated that according to one embodiment of the present invention, the non-removable security element 202 is near field communication (NFC) enabled.

It is appreciated that the first moblet software module 204 becomes operable on the electronic device 210 when it is installed on the electronic device 210. The first moblet software module 204 may manage additional moblet software modules. It is appreciated that the first moblet software module 204 may operate within the electronic wallet environment. For example, moblet software modules are operable in a MOJAX environment operating on a device. According to one embodiment, MOJAX is device specific while moblet software modules operating within the MOJAX environment are device generic. According to one embodiment, the electronic wallet environment may have a corresponding graphical element icon. Upon selection of the electronic wallet environment, additional graphical element icons associated with moblet software modules may be displayed. The displayed moblet software modules may be executed upon selection thereof.

The first banking card information 205 may be communicated to the non-removable security element 202 from the TSM 220 after the identity of the user is verified and authenticated. The TSM 220 may also communicate and notify 207 the first moblet software module 204 that the first banking card information 205 has been communicated and stored in the non-removable security element 202. It is appreciated that the non-removable security element 202 may transmit an acknowledgement signal to the TSM 220 that the first banking card information 205 has been received and stored.

The first moblet software module 204 may notify 209 the remote server 230 that the first banking card information 205 has been received and stored in the non-removable security element 202. In response to the notification 209, the remote server 230 may automatically transmit 211a second moblet software module to the first moblet software module 204. It is appreciated that the second moblet software module may be an application related to the first banking card information 205. The first moblet software module 204 may receive and install the second moblet software module 206 on the electronic device 210. As a result, the first banking card information 205 may be used in conjunction with the execution of the second moblet software module 206 to enable the user to interact with the second moblet software module 206 and the first banking card information 205 associated therewith. It is appreciated that the second moblet software module 206 may be a GUI type application that when executed enables user interaction therein to perform banking applications.

According to one embodiment, the second moblet software module 206 may be transmitted wirelessly and installed on the electronic device 210 transparent to the user. It is appreciated that updates to the second moblet software module 206 may be transmitted and installed automatically. However, it is appreciated that the second moblet software module 206 or any updates thereof may be received and installed on the electronic device 210 responsive to a user initiated request.

It is appreciated that additional banking card information and moblet software modules associated therewith may be similarly received and installed. For example, a second banking card information 213 may be transmitted from the TSM 220 to the non-removable security element 202. It is appreciated that the second banking card information 213 may be transmitted responsive to a request for a third moblet software module that does not exist on the electronic device 210. The non-removable security element 202 may store the second banking card information 213. The non-removable security element 202 may transmit an acknowledgement signal to the TSM 220 that the second banking card information 213 has been received and stored. The TSM 220 may subsequently notify 215 the first moblet software module 204 of the transmission of the second banking card information.

According to one embodiment, the first moblet software module 204 notifies 217 the remote server 230 that the second banking card information 213 has been received. Responsive to the notification 217, the remote server 230 may automatically transmit 219 a third moblet software module to the first moblet software module 204. The first moblet software module 204 may thereafter install and store the third moblet software module 208. It is appreciated that the third moblet software module 208 may be an application related to the second banking card information 213. As a result, the second banking card information 213 may be used in conjunction with the execution of the third moblet software module 208 to enable the user to interact with the third moblet software module 208 and the second banking card information 213 associated therewith. It is appreciated that the third moblet software module 208 may be a GUI type application that enables user interaction therein to perform banking applications.

According to one embodiment of the present invention, the first, the second and the third moblet software modules include device independent commands of a generic syntax. In one embodiment, the first, the second and the third moblet software modules may be written using MOJAX commands.

MOJAX is a language that enables manipulation of a web browser and flash. It is appreciated that the MOJAX commands are executed by dependent software of the electronic device 210. The dependent software of the electronic device 210 resides on the electronic device 210.

According to one embodiment, the third moblet software module 208 may be transmitted wirelessly and installed on the electronic device 210 transparent to the user. It is appreciated that updates to the third moblet software module 208 may be transmitted and installed automatically. However, it is appreciated that the third moblet software module 208 or any updates thereof may be received and installed on the electronic device 210 responsive to a user request.

It is appreciated that the transmission and installation of banking card information is exemplary and should not be construed as limiting the scope of the present invention. As such, any kind of information and moblet may be transmitted and installed within the MOJAX environment. For example, non-associated modules, e.g., coupon information, advertising, etc., may be transmitted and installed without requiring the TSM 220 to interact with the non-removable security element 202 and/or without requiring the TSM 220 to interact with the first moblet software module 204. As such, non-associated modules may be directly transmitted by the remote server 230 to the first moblet software module 204 that operates within the MOJAX environment. It is appreciated that the transmission and installation of non-associated modules may be performed automatically by the remote server 230 or it may be responsive to a user interaction and/or user initiation.

Figure 3:
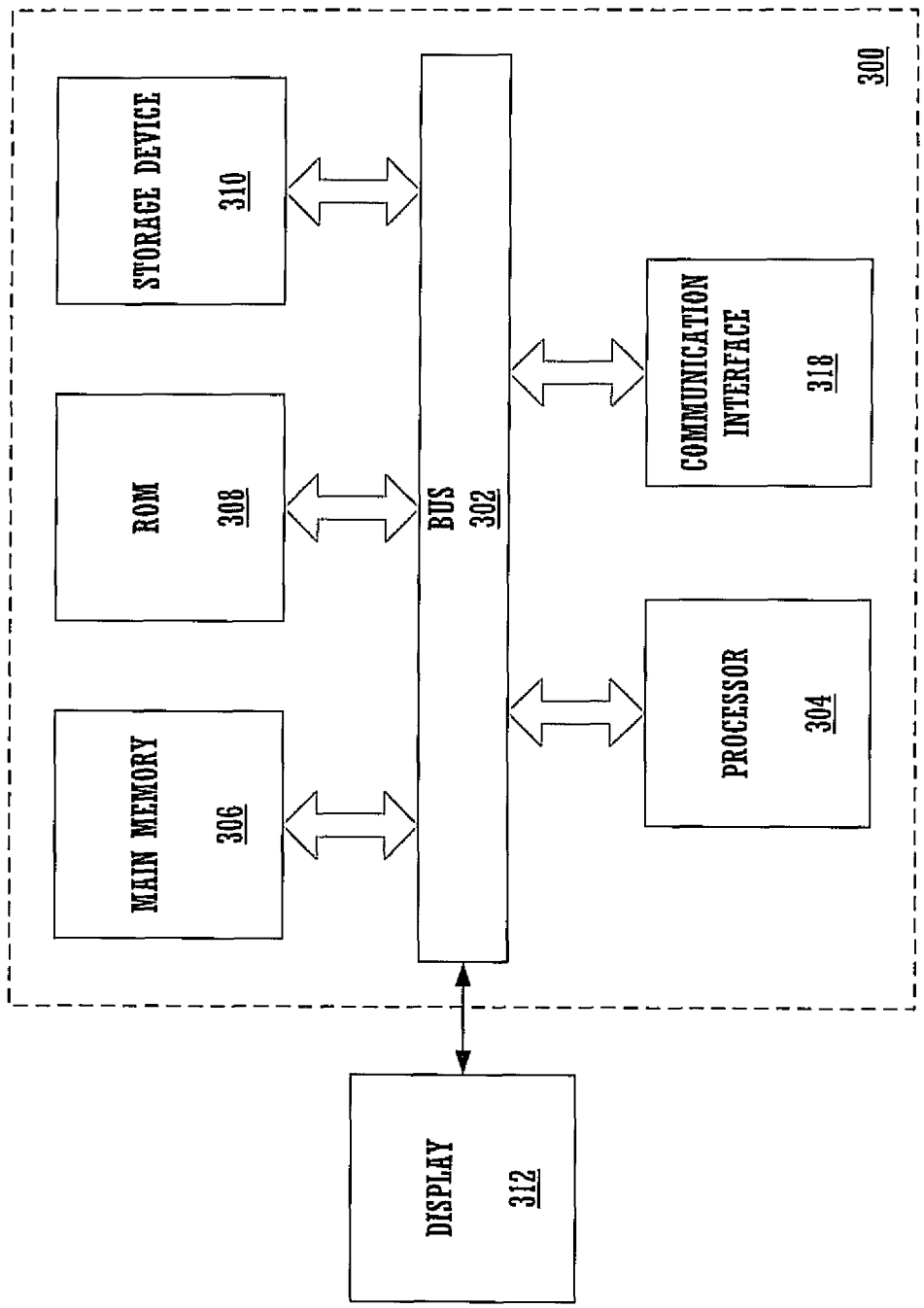
FIG. 3 illustrates a general purpose computer system that may serve as a platform for embodiments of the present invention.

FIG. 3 is a block diagram that illustrates a computer system 300 upon which embodiments of the invention may be implemented. Computer system 300 may implement the process for downloading information from a remote server as described above in conjunction with FIGS. 1 and 2. The computer system 300 may include a bus 302 or other communication mechanism for communicating information, and a processor 304 coupled with bus 302 for processing information.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A non-volatile storage device 310, such as a magnetic disk or optical disk, is provided and coupled to bus 302 for storing information and instructions and may store the persistent internal queue. According to one embodiment, the instructions for implementing the virtual device may be stored on any one of the memory components (e.g., RAM, ROM, non-volatile storage device and etc.). Computer system 300 may be coupled via bus 302 to an optional display 312 for displaying information to a computer user.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 4:
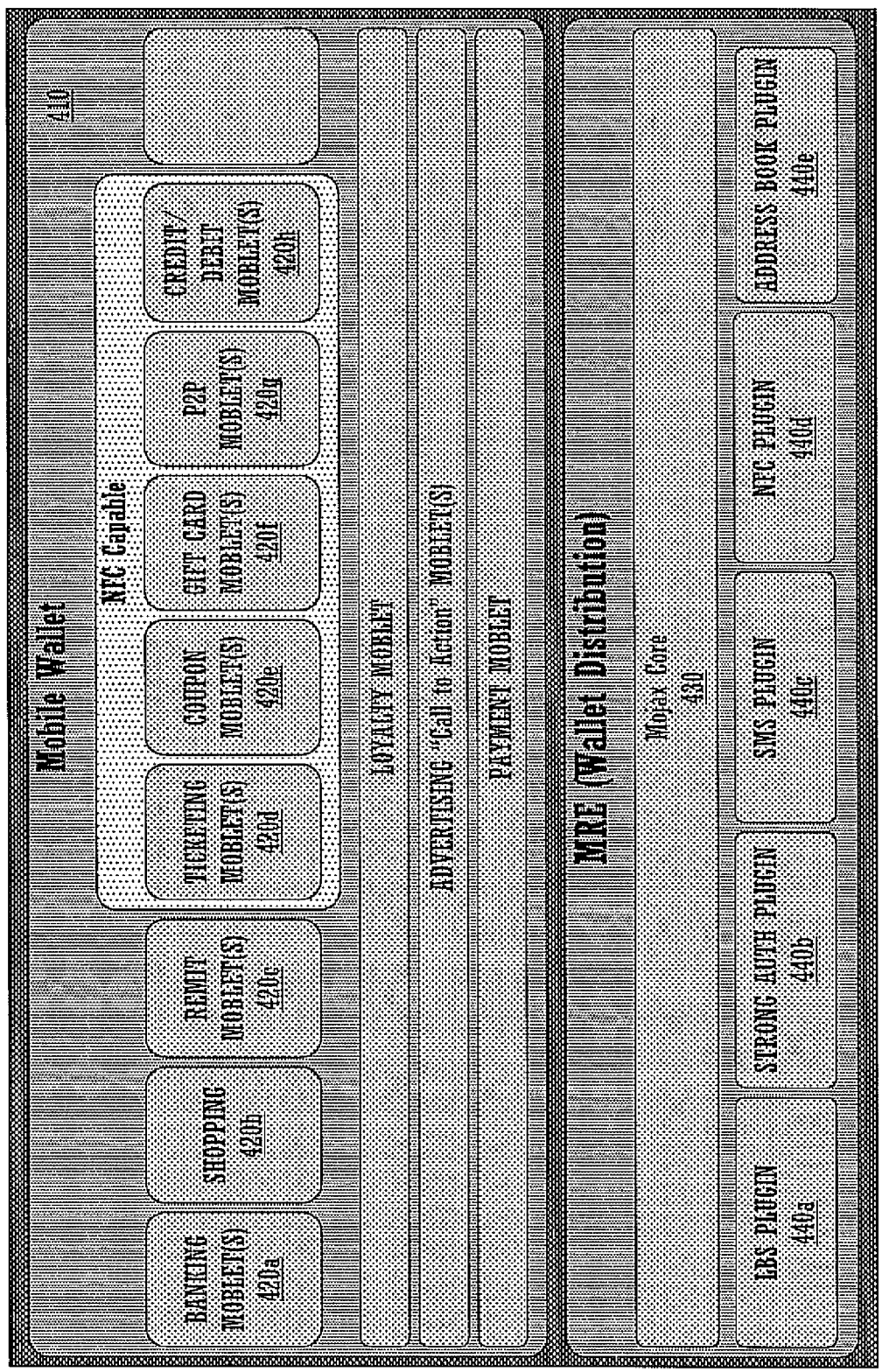
FIG. 4 shows a MOJAX enabled wallet component architecture in accordance with one embodiment of the present invention.

FIG. 4 illustrates an exemplary component architecture for an electronic wallet in accordance with embodiments of the present invention. As shown, a mobile wallet 410 controls the operations and user selection of a plurality of other moblet software modules, e.g., moblets 420a-420h. Moblets 420a-420h provide the user with a wide range and variety of financial services and applications such as banking applications, shopping applications, coupon applications, credit card applications, etc. A wallet moblet is a moblet that runs within the mobile wallet 410. It is appreciated that the first moblet 410 and all other moblets 420a-420h operate within a MOJAX framework according to the installed MOJAX core 430. The MOJAX core may be device specific, but since it operates as a platform for operation of the moblets, the moblets themselves may be written in a device-independent syntax that is only MOJAX-specific. It is appreciated that the component architecture shown in FIG. 4 represents a software hierarchy of software components installed on a portable computer system as described herein.

Wallet moblets 420a-420h are self-contained applications and in one embodiment, only one wallet moblet can operate in the wallet at any given time. Moblets can pass control to other moblets within the wallet. Moblets can be updated, blocked or removed by the mobile wallet 410. Moblets may have their own secure cache for data that cannot be accessed by any other moblet. Moblets generally cannot be modified by other moblets and they can have their own dedicated gateways. Moblets pass control between themselves for interaction. Moblet 420a may pass control to moblet 420b by passing a registry function thereto. Parameters can be passed between the moblets during load. Moblets have no visibility into the data of another moblet. After load, moblet 420a will no longer be running and moblet 420b becomes active, in this example. Only registered moblets can be launched and if a moblet is not present on the device, launching it will first trigger a download of the moblet from a remote control.

More specifically, the mobile wallet 410 controls the GUI environment that allows user selection of the other moblets 420a-420h so that moblet presentation and user selection can be performed in a uniform graphical environment. Also, the mobile wallet 410 controls the sequence in which the other moblets 420a-420h are executed. Mobile wallet 410 also controls the manner and timing in which other moblets are downloaded to the portable computer system, as described herein. It is appreciated that the component architecture may also contain several plug-ins as shown as 440a-440e. Plug-ins are APIs that can be used by any moblet and not all plug-ins may be available for a device, e.g., NFC. Plugins are part of a moblet runtime environment (MRE) distribution and are not moblets.

FIGS. 5A-5D show an exemplary embedded card personalization in accordance with one embodiment of the present invention. The embedded card personalization comprises a secure element that is embedded within the device. The TSA agent and a wallet moblet operate within the MRE. The TSA agent performs all the interactions with the secure element.

Figure 5B:
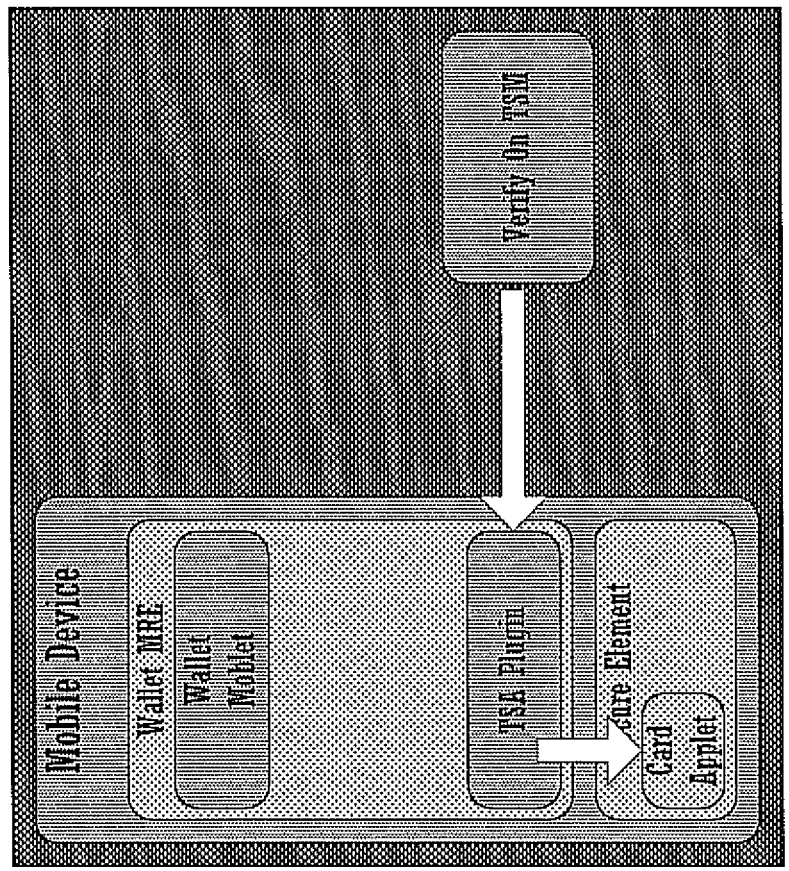
FIGS. 5A-5D show an exemplary embedded card personalization in accordance with one embodiment of the present invention.
Figure 5A:
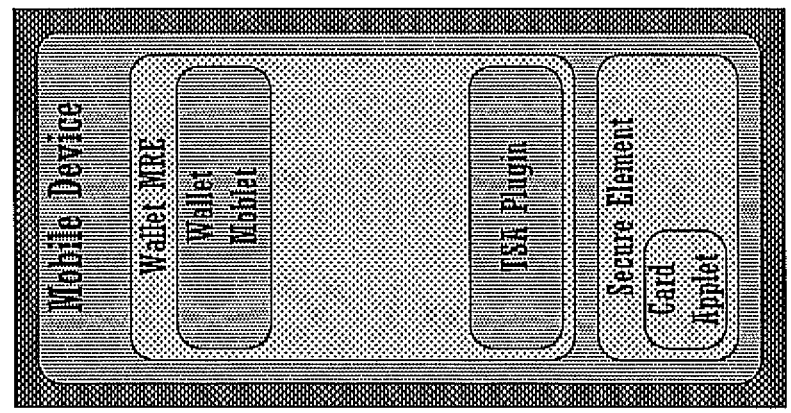
Figure 5D:
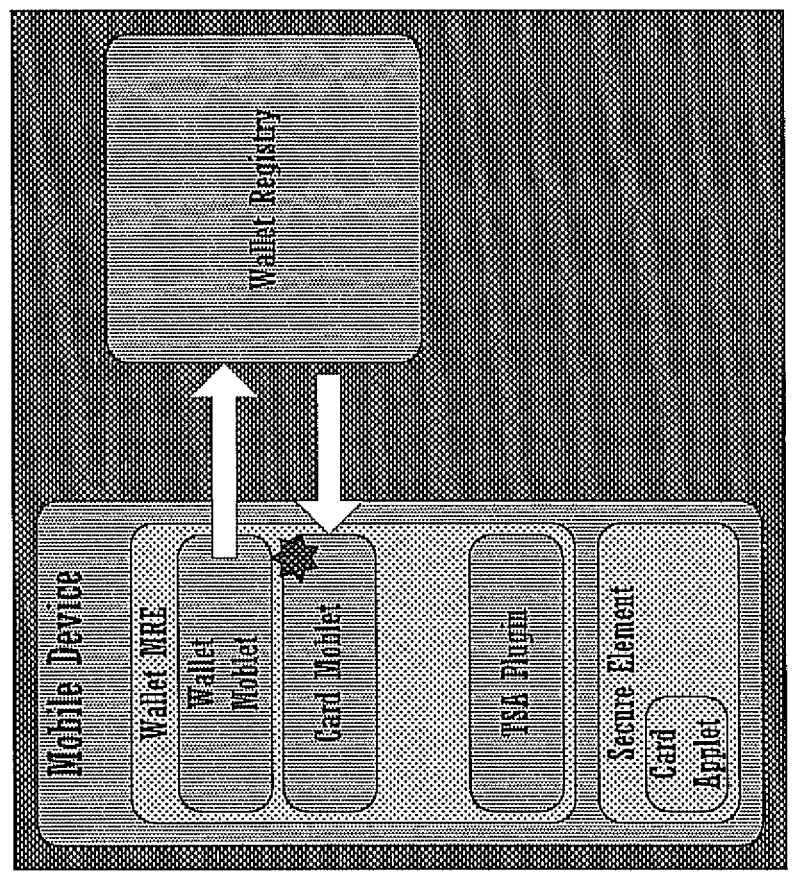
Figure 5C:
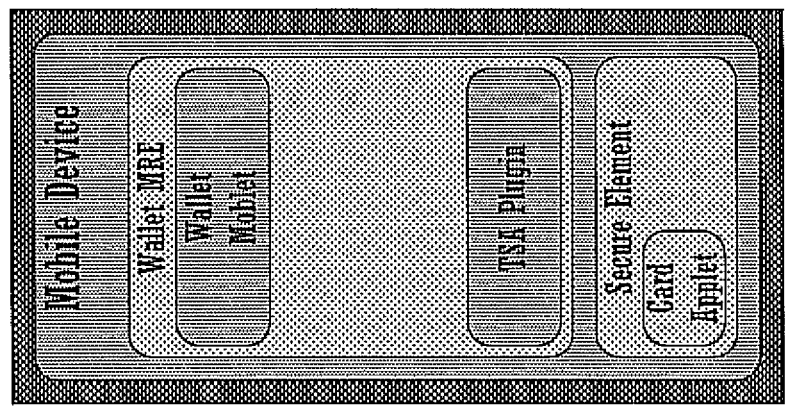

For example, referring to FIG. 5B, TSM pushes a new card applet into the TSA agent. In one embodiment, the new card applet may be banking information. As a result, the TSA agent communicates and pushes the received information into the secure element. Referring now to FIG. 5C, the TSA agent notifies the wallet moblet operating within the MOJAX environment that the information from the TSM has been received. Referring now to FIG. 5D, the wallet moblet in response to the notification from the TSA agent request a card moblet from the wallet registry. In response to the request, the wallet registry transmits the card moblet to the wallet MRE where the card moblet is installed within the MOJAX environment.

Figure 6B:
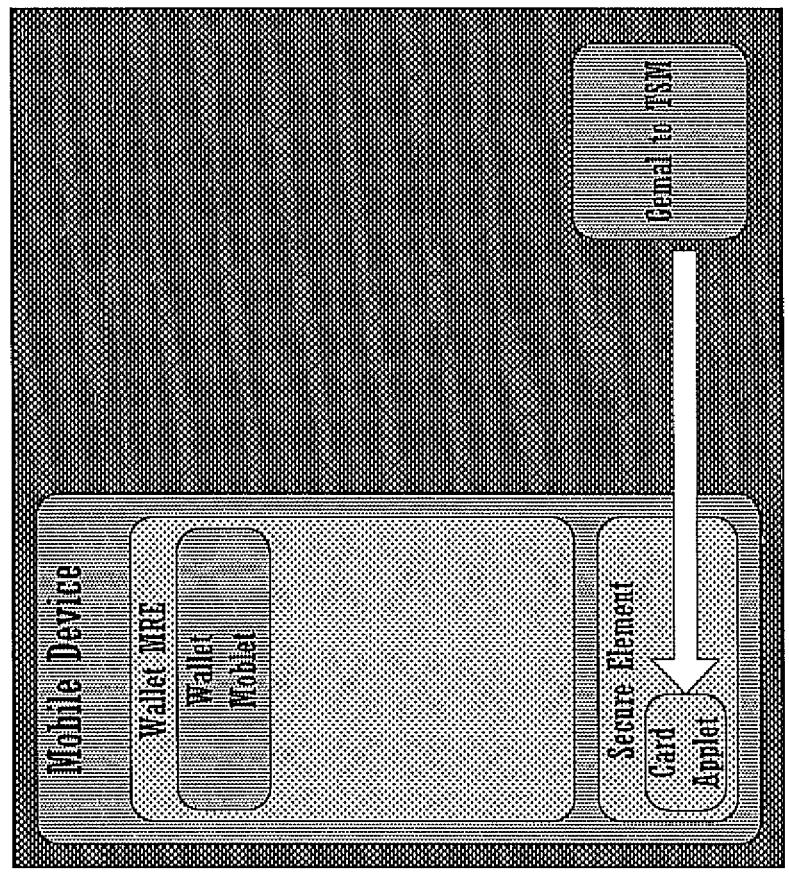
FIGS. 6A-6D show externalized card personalization in accordance with one embodiment of the present invention.
Figure 6A:
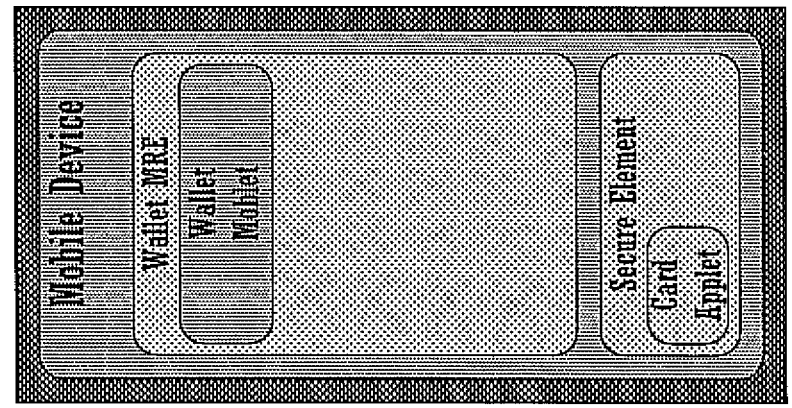
Figure 6D:
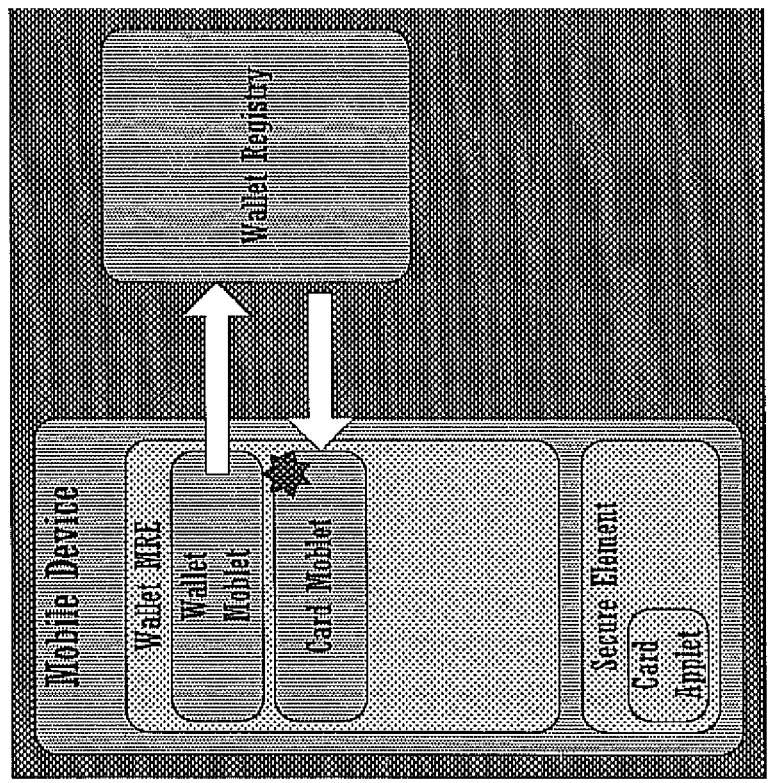
Figure 6C:
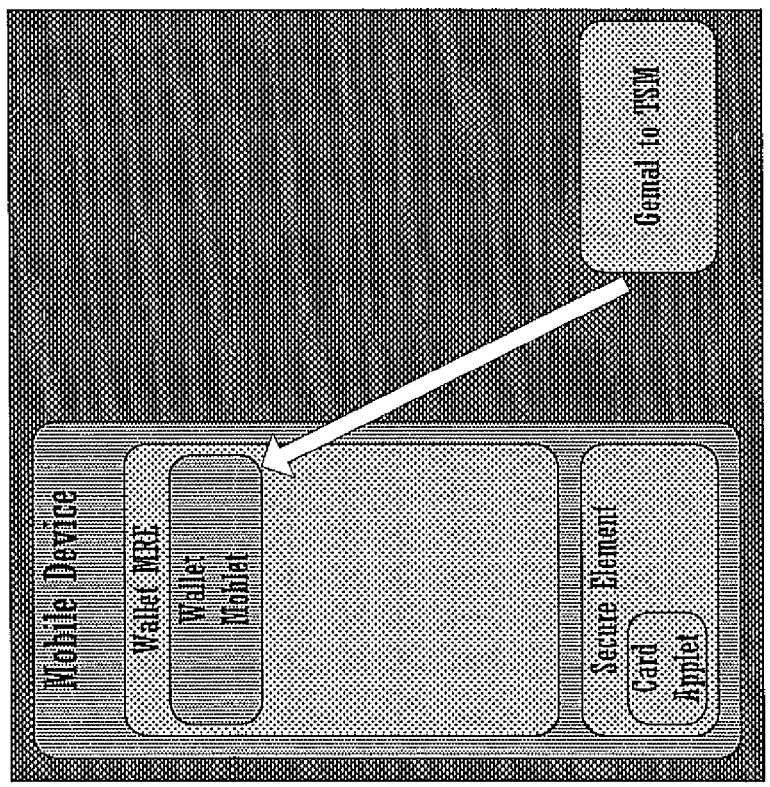

FIGS. 6A-6D show externalized card personalization in accordance with one embodiment of the present invention. Externalized card personalization may comprise a removable secure element. Removable secure elements do not require a TSA agent to interact with the secure element. The wallet MRE comprises a wallet moblet. Referring now to FIG. 6B, the TSM pushes the new card applet into the removable secure element. Referring now to FIG. 6C, the TSM notifies the wallet moblet operating within the wallet MRE, e.g., MOJAX environment, that the new card applet is installed. Referring now to FIG. 6D, the wallet moblet in response to receiving the notification from the TSM may send a request for a card moblet to the wallet registry. In response to the request, the wallet registry may transmit the card moblet to the wallet MRE where the card moblet is installed.

Figure 7B:
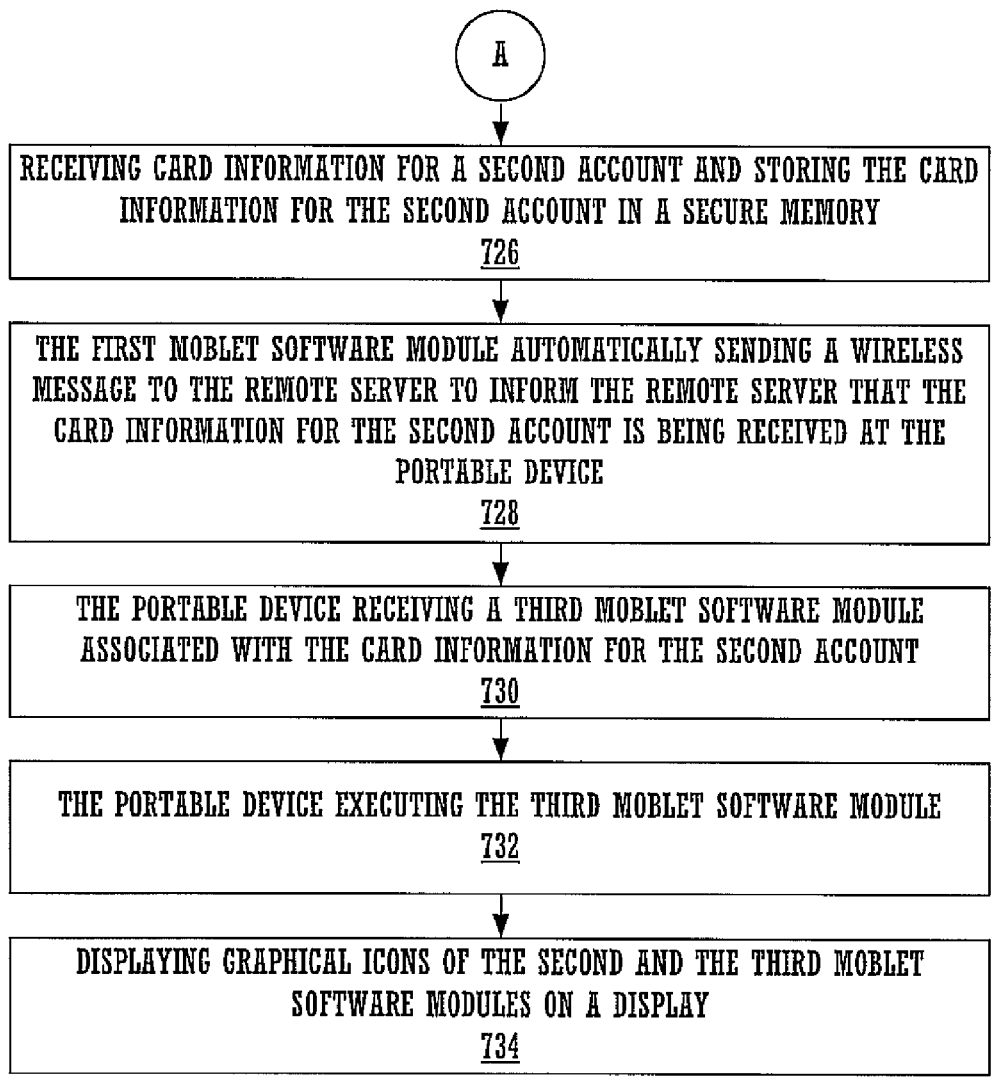

Referring now to FIGS. 7A and 7B, an exemplary flow diagram 700 for downloading information into a secure element in accordance with one embodiment of the present invention is shown. At step 710, responsive to a user request, the portable device, e.g., cellular phone, sends a message to a remote server to download a first moblet software module. It is appreciated that the message sent to the remote server may indicate a device type of the potable device.

At step 712, the portable device receives a device dependent software module. The device dependent software module is transmitted by the remote server via a wireless network. At step 714, the portable device receives the first moblet software module from the remote server via a wireless network.

At step 716, the portable device executes the first moblet software module using the device dependent software module. It is appreciated that according to one embodiment, the device dependent module resides on the portable device. The portable device receives card information associated with a first account and stores the card information in a secure memory within the portable device, at step 718.

At step 720, the first moblet software module automatically sends a wireless message, e.g., via a wireless network, to the remote server to inform the remote server that the card information is being received at the portable device. In one embodiment, the automatic transmission of the wireless message at step 720 is responsive to the receiving of the card information at step 718.

According to one embodiment, at step 722, the portable device receives, e.g., wirelessly via a wireless network, a second moblet software module associated with the card information. In one embodiment, the second moblet software module is received in a manner that is transparent to the user of the portable device. The portable device executes the second moblet software module that utilizes the card information, at step 724. It is appreciated that according to one embodiment, the first and the second moblet software modules comprise device independent commands of a generic syntax. According to one embodiment, the first and the second moblet software modules are written using MOJAX commands.

At step 726, the portable device receives card information for a second account and stores the card information for the second account into the secure memory within the portable device. According to one embodiment, at step 728, the first moblet software module automatically sends a wireless message to the remote server to inform the remote server that the card information for the second account is being received by the portable device. It is appreciated that the automatic transmission of the wireless message may be responsive to receiving the card information for the second account. According to one embodiment, at step 730, the portable device receives a third moblet software module associated with the card information for the second account. At step 732, the portable device executes the third moblet software module that utilizes the card information for the second account.

It is appreciated that the third moblet software module comprises device independent commands of the generic syntax. The device independent commands of the third moblet software module may be executed by the device dependent software module.

At step 734, graphical icons of the second and the third moblet software modules are rendered on a display of the portable device. The graphical icons are user selectable. It is appreciated that the display and selection of the second and the third moblet software modules are controlled by operations of the first moblet software module.

Accordingly, the functionality of a conventional card is combined with an electronic device to create an electronic wallet to enable a user to interact with an account associated with the conventional card. Thus, the electronic wallet can be used as a credit card in an easy-to-use fashion while maintaining its functionalities as an electronic device. Furthermore, the financial information is installed on the electronic wallet in a secure manner that may be transparent to the user In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for downloading information from a remote server, said method comprising:
   receiving, at a portable device, from a trusted entity, card information for a first account and storing said card information into a secure memory within said portable device;
   responsive to said receiving, a first moblet software module, which is configured to be device dependent, automatically sending a wireless message to said remote server to inform said remote server of said card information being received at said portable device;
   said portable device receiving, from said remote server, a second moblet software module associated with said card information and which is configured to be controlled by the operations of the first moblet software module, wherein said receiving said second moblet software module is performed transparently to a user of said portable device; and said portable device executing said second moblet software module which utilizes said card information, wherein said first and second moblet software modules comprise device independent commands of a generic syntax, and wherein further said device independent commands are executed by a device dependent software module also resident on said portable device.

2. A method as described in claim 1, wherein said receiving said second moblet software module is performed wirelessly.

3. A method as described in claim 1 further comprising:
responsive to a user request, said portable device sending a message to said remote server to download said first moblet software module and indicating therein a device type of said portable device;
said portable device receiving from said remote server said device dependent software module via a wireless network;
said portable device receiving from said remote server said first moblet software module via a wireless network; and
said portable device executing said first moblet software module using said device dependent software module.

4. A method as described in claim 1 wherein said first and second moblet software modules are written using MOJAX commands.

5. A method as described in claim 1 wherein said portable device is a cellular phone.

6. A method as described in claim 1 wherein said automatically sending a wireless message and said receiving said second moblet software module both utilize a wireless network.

7. A method as described in claim 1 further comprising:
receiving, at said portable device, card information for a second account and storing said card information for said second account into said secure memory within said portable device;
responsive to said receiving, said first moblet software module automatically sending a wireless message to said remote server to inform said remote server of said card information for said second account being received at said portable device;
said portable device receiving a third moblet software module associated with said card information for said second account; and
said portable device executing said third moblet software module which utilizes said card information for said second account, wherein said third moblet software module comprises device independent commands of said generic syntax, and wherein further said device independent commands of said third moblet software module are executed by said device dependent software module.

8. A method as described in claim 7 further comprising:
displaying graphical icons of said second and third moblet software modules on a display of said portable device allowing user selection thereof, wherein display and selection of said second and third moblet software modules are controlled by operations of said first moblet software module.

9. An electronic device comprising:
a processor for processing data;
a removable security element operable to store data in a secure manner; and
a memory component operable to store data, wherein said memory component comprises instructions that when executed implement a method for downloading information from a remote server, said method comprising:
receiving card information for a first account from a trusted service manager (TSM);
storing said card information into said removable security element;
subsequent to said receiving and said storing, transmitting, by a first moblet software module received from said remote server, a signal to said remote server to notify said remote server that said card information is received and stored, and wherein the first moblet software module is device dependent; and
subsequent to said transmitting, receiving, from said remote server, a second moblet software module configured to enable use of said card information, wherein said receiving said second moblet software module is performed transparently to a user of said electronic device, and wherein operation of said second moblet software module is controlled by operations of the first moblet software module.

10. The electronic device as described in claim 9, wherein said first and said second moblet software modules comprise device independent commands of a generic syntax, and wherein further said device independent commands are executed by a device dependent software module resident on said electronic device.

11. The electronic device as described in claim 9, wherein said removable security element is a subscriber identity module (SIM) card.

12. The electronic device as described in claim 9, wherein said receiving said second moblet software module is performed responsive to a user request operating said electronic device.

13. The electronic device as described in claim 9, wherein said method further comprises:
automatically receiving an update for said second moblet software module.

14. The electronic device as described in claim 9, wherein said second moblet software module is received wirelessly.

15. The electronic device as described in claim 9, wherein said method further comprises:
executing said second moblet software module that utilizes said card information for said first account.

16. The electronic device as described in claim 9, wherein said method further comprises:
responsive to a user request, said electronic device transmitting a signal to said remote server to download said first moblet software module and indicating therein a device type of said electronic device;
said electronic device receiving from said remote server a device dependent software module via a wireless network;
said electronic device receiving from said remote server said first moblet software module via a wireless network; and
said electronic device executing said first moblet software module using said device dependent software module.

17. The electronic device as described in claim 9, wherein said method further comprises:
receiving a second card information for a second account;
storing said second card information for said second account into said removable security element;
responsive to said receiving said second card information, said first moblet software module automatically transmitting a second signal to said remote server to notify said remote server that said second card information is received; and in response to said transmitting said second signal, said first moblet software module receiving a third moblet software module associated with said second card information for said second account; and executing said third moblet software module that utilizes said second card information for said second account, wherein said third moblet software module comprise device independent commands of a generic syntax and wherein further said commands are executed by a device dependent software module.

18. The electronic device as described in claim 17, wherein said method further comprises:

displaying graphical icons for said second and said third moblet software modules on a display, wherein said displaying is operable to allow a user selection thereof, and wherein display and selection of said second and said third moblet software modules are controlled by operations of said first moblet software module.

19. The electronic device as described in claim 9, wherein said removable security element comprises a near field communication chip.

20. An electronic device comprising:

a processor for processing data;

a non-removable security element operable to store data in a secure manner, wherein said non-removable security element receives and stores card information for a first account from a trusted service manager (TSM); and a memory component operable to store data, wherein said memory component comprises instructions that when executed implement a method for downloading information from a remote server, said method comprising:

subsequent to said non-removable security element receiving and storing said card information for said first account, receiving, from said remote server, by a first moblet software module that is configured to be device dependent, a signal from said TSM that said card information for said first account is received and stored;

responsive to said receiving, transmitting, by said first moblet software module, a signal to said remote server to notify said remote server that said card information is transmitted; and subsequent to said transmitting, receiving, from said remote server, a second moblet software module configured to enable use of said card information, wherein said receiving said second moblet software module is performed transparently to a user of said electronic device, and wherein said second moblet software module is configured to be controlled by operations of the first moblet software module.

21. The electronic device as described in claim 20, wherein said first and said second moblet software modules comprise device independent commands of a generic syntax, and wherein further said device independent commands are executed by a device dependent software module resident on said electronic device.

22. The electronic device as described in claim 20, wherein said electronic device is a cellular phone.

23. The electronic device as described in claim 20, wherein said receiving said second moblet software module is performed responsive to a user request operating said electronic device.

24. The electronic device as described in claim 20, wherein said method further comprises:

automatically receiving an update for said second moblet software module.

25. The electronic device as described in claim 20, wherein said second moblet software module is received wirelessly.

26. The electronic device as described in claim 20, wherein said method further comprises:

executing said second moblet software module that utilizes said card information for said first account.

27. The electronic device as described in claim 20, wherein said method further comprises:

responsive to a user request, said electronic device transmitting a signal to said remote server to download said first moblet software module and indicating therein a device type of said electronic device;

said electronic device receiving from said remote server a device dependent software module via a wireless network;

said electronic device receiving from said remote server said first moblet software module via a wireless network; and said electronic device executing said first moblet software module using said device dependent software module.

28. The electronic device as described in claim 20, wherein said non-removable security element receives and stores a second card information for a second account from said TSM.

29. The electronic device as described in claim 28, wherein said method further comprises:

responsive to said receiving said second card information, said first moblet software module automatically transmitting a second signal to said remote server to notify said remote server that said second card information is received;

in response to said transmitting said second signal, said first moblet software module receiving a third moblet software module associated with said second card information for said second account; and executing said third moblet software module that utilizes said second card information for said second account, wherein said third moblet software module comprise device independent commands of a generic syntax, and wherein further said device independent commands are executed by a device dependent software module.

30. The electronic device as described in claim 29, wherein said method further comprises:

displaying graphical icons for said second and said third moblet software modules on a display, wherein said displaying is operable to allow a user selection thereof, and wherein display and selection of said second and said third moblet software modules are controlled by operations of said first moblet software module.

31. The electronic device as described in claim 20, wherein said non-removable security element comprises a near field communication chip.

* * * * *

UNITED STATES PATENT AND TRADEMARK OFFICE
CERTIFICATE OF CORRECTION

PATENT NO. : 8,615,466 B2
APPLICATION NO. : 12/621319
DATED : December 24, 2013
INVENTOR(S) : Rodney Aiglstorfer et al.

Page 1 of 1

It is certified that error appears in the above-identified patent and that said Letters Patent is hereby corrected as shown below:

In the Claims

Claim 17, Col. 15, Line 7, "comprise" should read as --comprises--.

Claim 29, Col. 16, Line 44, "comprise" should read as --comprises--.

Signed and Sealed this
Fifteenth Day of April, 2014

Michelle K. Lee
*Deputy Director of the United States Patent and Trademark Office*